US009771038B2

(12) United States Patent
Mori

(10) Patent No.: US 9,771,038 B2
(45) Date of Patent: Sep. 26, 2017

(54) NOTIFICATION DEVICE

(71) Applicant: HONDA MOTOR CO., LTD., Tokyo (JP)

(72) Inventor: Takashi Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 14/870,346

(22) Filed: Sep. 30, 2015

(65) Prior Publication Data

US 2016/0098912 A1    Apr. 7, 2016

(30) Foreign Application Priority Data

Oct. 3, 2014  (JP) ................... 2014-205088

(51) Int. Cl.
*B60Q 1/00*    (2006.01)
*B60R 16/037*  (2006.01)
*B60C 9/00*    (2006.01)

(52) U.S. Cl.
CPC .............. *B60R 16/037* (2013.01); *B60C 9/00* (2013.01)

(58) Field of Classification Search
None
See application file for complete search history.

(56) References Cited

U.S. PATENT DOCUMENTS 7,221,266 B2 *  5/2007  Cowelchuk ............... H04S 7/00
                                              340/438
2003/0222787 A1 * 12/2003 Shimamoto ........... B60R 25/102
                                              340/870.07

(Continued)

FOREIGN PATENT DOCUMENTS

| JP | 59-53244 A | 3/1984 |
|---|---|---|
| JP | 09-73588 A | 3/1997 |
| JP | 2013-082457 A | 5/2013 |
| JP | 2013-179716 A | 9/2013 |
| WO | 2014/087790 A1 | 6/2014 |
| WO | 2016/047623 A1 | 3/2016 |

OTHER PUBLICATIONS

Office Action dated May 24, 2016, issued in counterpart Japanese Patent Application No. 2014-205088, with English translation. (18 pages).

*Primary Examiner* — Curtis King
(74) *Attorney, Agent, or Firm* — Westerman, Hattori, Daniels & Adrian, LLP

(57) ABSTRACT

A notification device includes an identification information acquisition section that acquires identification information output from an in-vehicle device in response to a change of a vehicle condition, a sound source data acquisition section capable of performing an acquisition operation of acquiring sound source data from an outside, a storage section capable of storing the sound source data for notification acquired by the sound source acquisition section and association data in which the identification information and the sound source data for notification are associated with each other, and a control section that outputs the sound source data for notification on the basis of the association data when the identification information acquisition section acquires the identification information. The sound source data acquisition section and the storage section are provided in a mobile terminal, and the mobile terminal is provided with an association data edit section capable of editing the association data.

15 Claims, 3 Drawing Sheets

(56) References Cited

U.S. PATENT DOCUMENTS

| | | | |
|---|---|---|---|
| 2005/0261815 A1* | 11/2005 | Cowelchuk | B60R 16/037 701/36 |
| 2005/0283286 A1* | 12/2005 | Kanda | B60R 16/0232 701/29.6 |
| 2006/0259434 A1* | 11/2006 | Vilcauskas, Jr. | G06F 21/10 705/57 |
| 2007/0182532 A1* | 8/2007 | Lengning | G10H 1/0041 340/439 |
| 2007/0242836 A1* | 10/2007 | Basir | B60Q 5/00 381/86 |
| 2008/0065274 A1* | 3/2008 | Taki | B60R 25/2009 701/2 |
| 2008/0207175 A1* | 8/2008 | Wang | H04M 1/72519 455/412.2 |
| 2008/0238642 A1* | 10/2008 | Mauti | G08G 1/205 340/438 |
| 2009/0079555 A1* | 3/2009 | Aguirre De Carcer | G07C 5/008 340/441 |
| 2009/0088207 A1* | 4/2009 | Sweeney | H04M 19/04 455/557 |
| 2009/0231128 A1* | 9/2009 | Watson | H04N 21/4147 340/540 |
| 2009/0261969 A1* | 10/2009 | Kobayashi | B60R 25/102 340/539.11 |
| 2010/0130174 A1* | 5/2010 | Venkob | H04M 3/533 455/412.2 |
| 2011/0029875 A1* | 2/2011 | Milch | B60R 25/104 715/727 |
| 2011/0169626 A1* | 7/2011 | Sun | B60Q 9/008 340/439 |
| 2012/0088462 A1* | 4/2012 | Mader | H04M 1/6075 455/161.1 |
| 2014/0094989 A1* | 4/2014 | Dadu | G08G 1/0962 701/1 |
| 2014/0266658 A1* | 9/2014 | Feldman | B60Q 5/008 340/438 |
| 2014/0306838 A1* | 10/2014 | Beumler | B60N 2/28 340/988 |
| 2015/0130604 A1* | 5/2015 | Gomez Collazo | B60N 2/002 340/457 |
| 2015/0187146 A1* | 7/2015 | Chen | G07C 5/008 701/31.5 |
| 2015/0191122 A1* | 7/2015 | Roy | G08G 1/0962 340/439 |
| 2016/0129883 A1* | 5/2016 | Penilla | B60R 25/305 348/148 |
| 2016/0241698 A1* | 8/2016 | Kim | H04M 1/7253 |

* cited by examiner

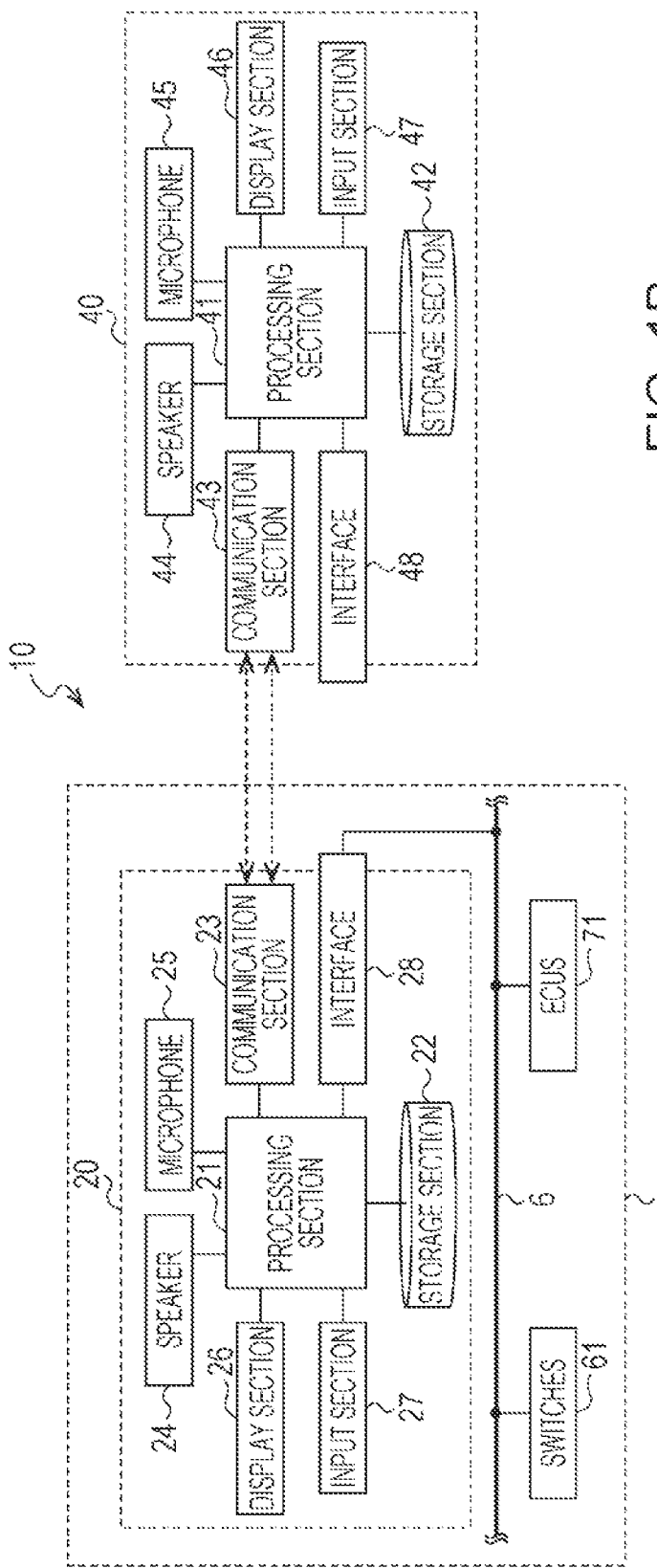
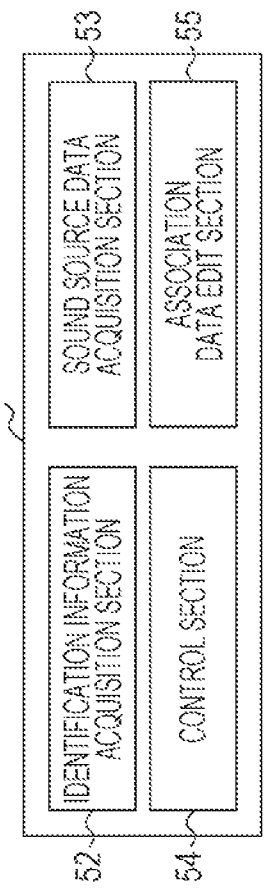
FIG. 1A
FIG. 1B

FIG. 2

| VEHICLE CONDITIONS | SOUND SOURCE DATA |
|---|---|
| GETTING-IN AND GETTING-OUT OF VEHICLE | |
| DOOR OPEN FOR GETTING-IN | SOUND SOURCE DATA 1 |
| ACC ON | SOUND SOURCE DATA 2 |
| ENGINE START | SOUND SOURCE DATA 3 |
| ENGINE STOP | SOUND SOURCE DATA 4 |
| DOOR OPEN FOR GETTING-OUT | SOUND SOURCE DATA 5 |
| ⋮ | ⋮ |
| ⋮ | ⋮ |
| SWITCH OPERATIONS | |
| FUEL TANK LID OPEN SWITCH | SOUND SOURCE DATA 11 |
| POWER WINDOW SWITCH | SOUND SOURCE DATA 12 |
| TRUNK LID SWITCH | SOUND SOURCE DATA 13 |
| HAZARD SWITCH | SOUND SOURCE DATA 14 |
| WINDOW WASHER SWITCH | SOUND SOURCE DATA 15 |
| HEADLIGHT SWITCH | SOUND SOURCE DATA 16 |
| ⋮ | ⋮ |
| ⋮ | ⋮ |
| SHIFTING OPERATIONS | |
| DRIVE RANGE | SOUND SOURCE DATA 21 |
| REVERSE RANGE | SOUND SOURCE DATA 22 |
| ⋮ | ⋮ |
| ⋮ | ⋮ |
| IDLING STOP | |
| ENGINE STOP | SOUND SOURCE DATA 31 |
| ENGINE RESTART | SOUND SOURCE DATA 32 |
| ⋮ | ⋮ |
| ⋮ | ⋮ |
| WARNINGS | |
| LOWERING OF REMAINING FUEL (ELECTRICITY) | SOUND SOURCE DATA 41 |
| DETECTING HALF-SHUT OF DOOR | SOUND SOURCE DATA 42 |
| DETECTING OBSTACLE | SOUND SOURCE DATA 43 |
| SEAT BELT UNWORN | SOUND SOURCE DATA 44 |
| ⋮ | ⋮ |

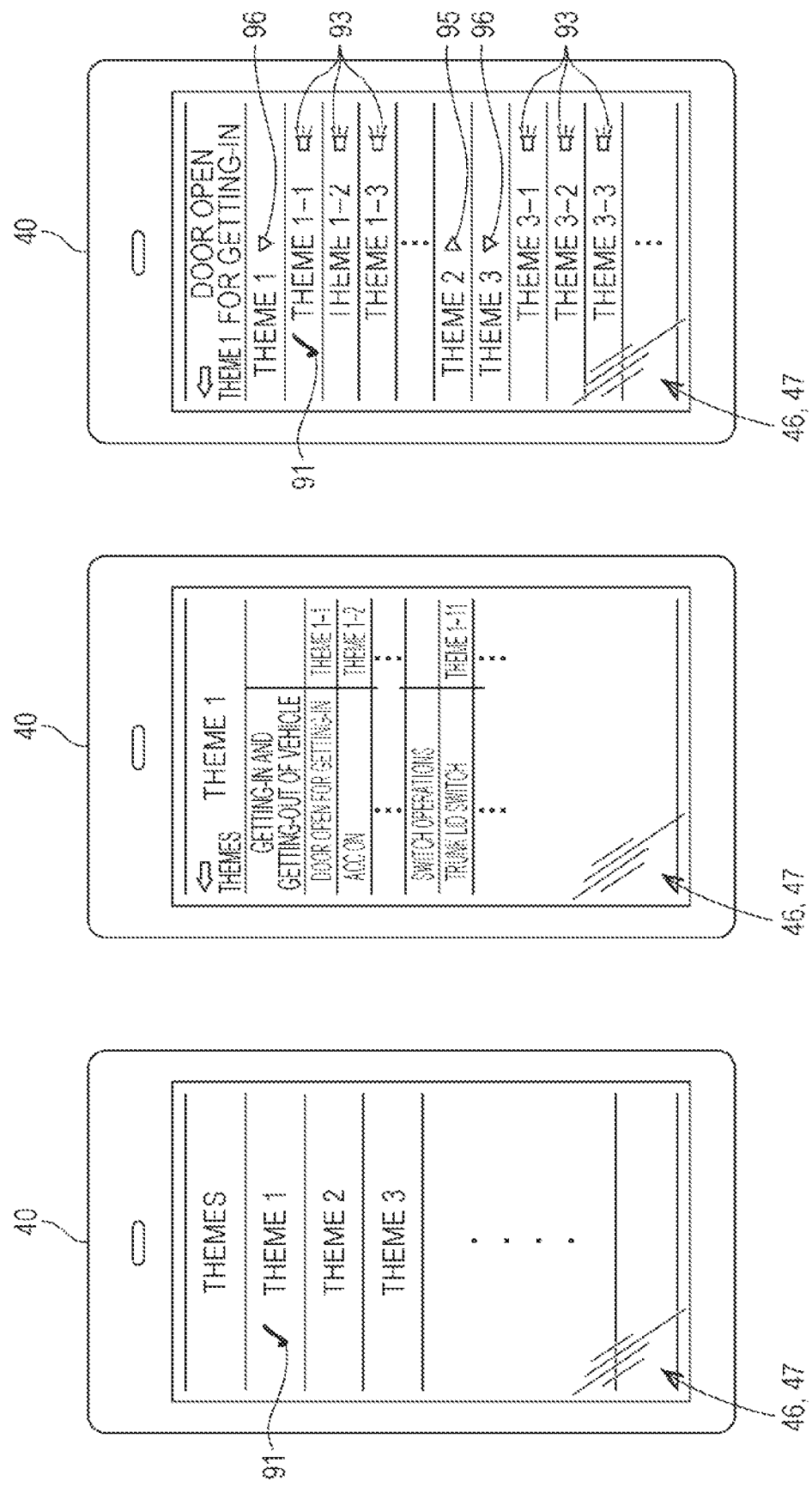

NOTIFICATION DEVICE

CROSS REFERENCES TO RELATED APPLICATIONS

The present application claims priority under 35 U.S.C. §119 to Japanese Patent Application No. 2014-205088, filed Oct. 3, 2014, entitled "Notification Device." The contents of this application are incorporated herein by reference in their entirety.

TECHNICAL FIELD

The present disclosure relates to a notification device, and more particularly, to a notification device that is capable of performing an acquisition operation of acquiring sound source data from the outside, and that outputs appropriate sound source data in accordance with a vehicle condition.

BACKGROUND

As an example of a notification device, Japanese Unexamined Patent Application Publication No. 2013-82457 (hereinafter, referred to as patent document) discloses a vehicle meter that alerts a user of the vehicle by using various types of warning sounds. The notification device disclosed in the patent document has a customize mode in which the user of the vehicle can customize various kinds of settings of specifications related to various types of warning sounds.

In the notification device disclosed in the patent document, the user of the vehicle can customize various kinds of settings of specifications related to various types of warning sounds for three items which are the frequency, the priority, and the tone (repeated pitch, monotone or chord, whether echo is applied or not) of the warning sounds. The patent document indicates that the notification device disclosed therein can satisfy requests of a user of the vehicle who has his own hearing characteristic and preference by customizing various kinds of settings of specifications related to various types of warning sounds by the user, thereby improving convenience of the notification device.

However, in the notification device disclosed in the patent document, the user of the vehicle can customize various types of warning sounds by using only the warning sounds that were provided when the notification device was manufactured, and an operation for acquiring warning sounds from the outside is not available. Therefore, if, for example, the user of the vehicle cannot recognize unambiguously the relationship between a warning sound to be notified and a corresponding condition of the vehicle, it is assumed that the user needs to memorize the relationship between the warning sound and the corresponding condition of the vehicle. In addition, in order to fully satisfy diversified preferences of users of vehicles, such as a case where the users of the vehicles desire to use their favorite music as a warning sound for notifying a condition of the vehicle, it is recognized that further improvement is necessary.

SUMMARY

The present application describes a notification device that can fully satisfy the preference of a user of a vehicle. The present application will be more clearly understood with reference to the following aspects, preferred embodiments, and accompanying drawings.

According to a first aspect of the present application, a notification device includes an identification information acquisition section that acquires identification information output from an in-vehicle device in response to a change of a vehicle condition, a sound source data acquisition section capable of performing an acquisition operation of acquiring sound source data from an outside, a storage section capable of storing the sound source data acquired by the sound source acquisition section and association data in which the identification information and the sound source data are associated with each other, and a control section that outputs the sound source data on the basis of the association data when the identification information acquisition section acquires the identification information.

In the first aspect, a user can perform an operation for acquiring not part of sound source data, such as frequency or tone, but the sound source data itself from the outside, and therefore, the acquired sound source data satisfies the preference of the user.

According to a second aspect of the present application, the sound source data acquisition section and the storage section in the first aspect may be provided in a mobile terminal capable of being carried by a user of the vehicle and capable of connecting to the in-vehicle device, and the mobile terminal may be provided with an association data edit section capable of editing the association data.

In the second aspect, the user can perform an operation for acquiring sound source data for notification and an operation for editing association data by using only the mobile terminal. Consequently, even in a case where the in-vehicle device is not provided with a function for connecting to the Internet, or is not provided with a high-level operation interface, such as a display panel module of a touch panel system, the operation for acquiring sound source data for notification and the operation for editing association data are facilitated, thereby improving convenience. Furthermore, it is not necessary to store sound source data for notification and association data in the in-vehicle device, thereby reducing the amount of storage space used in the storage section of the in-vehicle device.

According to a third aspect of the present application, the control section in the second aspect may be provided in the mobile terminal, and the sound source data may be output to the in-vehicle device and may be reproduced from a speaker installed in the vehicle.

In the third aspect, the control section provided in the mobile terminal transmits sound source data for notification corresponding to a condition of the vehicle to the in-vehicle device, and the sound source data for notification is reproduced from the speaker installed in the vehicle. Therefore, there is no need to provide the in-vehicle device with the functions of the control section. In addition, since the sound source data for notification is reproduced from the speaker installed in the vehicle, a predetermined acoustic pressure can be maintained, and therefore, the user can recognize the sound source data for notification more easily than a case where, for example, the sound source data is reproduced from the mobile terminal.

According to a fourth aspect of the present application, the in-vehicle device in the third aspect may be an audio device capable of reproducing different sound source data from the sound source data by driving the speaker, and when music data constituted by sound source data the type of which is music is input from the control section while the audio device is reproducing the different sound source data, the audio device may temporarily suspend the reproduction of the different sound source data to reproduce the music data, and/or when voice data constituted by only sound source data the type of which is voice is input from the control section while the audio device is reproducing the different sound source data, the audio device may reduce reproduction sound volume of the different sound source data to a predetermined value or less to reproduce the voice data and the different sound source data in a superimposed manner.

In the fourth aspect, the audio device, which is the in-vehicle device, temporarily suspends the reproduction of sound source data for audio, which is different sound source data from the sound source data for notification being reproduced, or temporarily reduces the sound volume, depending on the type of the sound source data for notification. As a result, the user can recognize the sound of the reproduced sound source data for notification without causing a feeling of strangeness even in a case where both of the reproduction of sound source data for notification and the reproduction of sound source data for audio are performed by the same speaker installed in the vehicle.

According to a fifth aspect of the present application, the identification information in the first aspect may be output from the in-vehicle device in such a manner that a condition of the vehicle, the condition relating to at least operation of a user of the vehicle, can be identified.

In the fifth aspect, when the user performs a predetermined operation that causes a condition of the vehicle to change, the control section can output sound source data that satisfies his preference.

According to a sixth aspect of the present application, wireless connection in the third aspect may be established between the mobile terminal and the in-vehicle device so as to enable communication between the mobile terminal and the in-vehicle device by using a wireless signal, and the wireless connection may serve also as wireless connection for a hands-free function in which a phone call on the mobile terminal is performed by using a microphone and a speaker installed in the vehicle.

In the sixth aspect, the notification device uses a highly versatile communication standard also for the linkage between the mobile terminal and the in-vehicle device, and therefore, there is no need to support various communication standards in the in-vehicle device and the mobile terminal. Thus, the cost for implementing the notification device and the complexity of setting can be reduced, thereby improving convenience.

According to a seventh aspect of the present application, wireless connection in the third aspect may be established between the mobile terminal and the in-vehicle device so as to enable communication between the mobile terminal and the in-vehicle device by using a wireless signal, the in-vehicle device may have a hands-free function in which a phone call on the mobile terminal is performed by using a microphone and a speaker installed in the vehicle, and communication for outputting the sound source data is performed by using wireless connection that uses a different communication standard from the communication for the hands-free function.

In a case where, for example, data transmission from the mobile terminal to the in-vehicle device by means of the hands-free function and transmission of sound source data for notification from the mobile terminal to the in-vehicle device by means of the notification device are performed concurrently, the communications can be performed smoothly even when either one of the communication traffics increases.

BRIEF DESCRIPTION OF THE DRAWINGS

The advantages of the disclosure will become apparent in the following description taken in conjunction with the following drawings.

FIGS. 1A and 1B are block diagrams illustrating a configuration example of a notification device of one embodiment of the present application.

FIG. 2 illustrates an example of association data stored in a storage section of a mobile terminal illustrated in FIG. 1A.

FIGS. 3A, 3B and 3C are examples of setting screens displayed on a display section of the mobile terminal illustrated in FIG. 1A for editing the association data illustrated in FIG. 2.

DETAILED DESCRIPTION

The preferred embodiments to be explained below are provided to facilitate understanding of the present application. Thus, it should be noted that the present application is not unduly limited to the embodiments hereinafter set forth.

As illustrated in FIGS. 1A and 1B, a notification device 10 includes an in-vehicle device 20, an identification information acquisition section 52, a sound source data acquisition section 53, a storage section 42, and a control section 54. In an example illustrated in FIG. 1A, the storage section 42 is provided in a mobile terminal 40. In addition to the storage section 42, the mobile terminal 40 may further include a processing section 41, a communication section 43, a speaker 44, a microphone 45, a display section 46, an input section 47, an interface 48, and so on. Furthermore, by executing a predetermined computer program stored in the storage section 42 by the processing section 41, for example, the processing section 41 (or a processing section 21) may become capable of operating as the identification information acquisition section 52, the sound source data acquisition section 53, the control section 54 and an association data edit section 55, as illustrated in FIG. 1B.

In the example illustrated in FIG. 1A, the in-vehicle device 20 includes a processing section 21, a storage section 22, a communication section 23, a speaker 24, a microphone 25, a display section 26, an input section 27, an interface 28, and so on. When the interface 28 is connected to an in-vehicle local area network (LAN), which is, for example, a control area network (CAN) 6, the in-vehicle device 20 can input and output signals from and to electronic control units (ECUs) 71 and switches 61 installed in a vehicle 1. In the example of FIG. 1A, the speaker 24 and the microphone 25 are illustrated as a speaker and a microphone provided in the in-vehicle device 20, however, the in-vehicle device 20 is not necessarily provided with the speaker 24 and the microphone 25. The speaker 24 and the microphone 25 may be a speaker and a microphone that are installed at different positions in the vehicle 1, such as a speaker for notifying warnings installed in a meter panel (not shown) or the like.

The in-vehicle device 20 is an audio device 20, for example, and is capable of reproducing sound source data stored in the storage section 22 and sound source data stored in an external recording medium, such as a compact disc (CD), by driving the speaker 24. The input section 27 is formed of an operation switch, for example, and the display section 26 is formed of a display panel module, for example. However, the input section 27 and the display section 26 may be formed of a display panel module of a touch panel system, for example. In such a case, users of the vehicle 1 including the owner thereof can operate the in-vehicle device 20 by operating the display panel module. The sound source data stored in the storage section 22 and the sound source data stored in an external recording medium, such as a CD, are hereinafter referred to also as "sound source data for audio". In addition, "the users of the vehicle 1 including the owner thereof" and "the users of the mobile terminal 40 including the owner thereof" are hereinafter referred to also as simply a "user".

The communication section 23 of the in-vehicle device 20 is formed of, for example, at least either of a Bluetooth (registered trademark) communication module and a wireless fidelity (WiFi) communication module. The in-vehicle device 20 can link with the mobile terminal 40 having the communication section 43 which is, as described later, formed of a Bluetooth (registered trademark) communication module, a WiFi communication module or the like, by using wireless connection using the Bluetooth (registered trademark) communication standard and/or the WiFi communication standard. Alternatively, the interface 28 of the in-vehicle device 20 and the interface 48 of the mobile terminal 40 may be connected by wire, such as a cable, so that the in-vehicle device 20 and the mobile terminal 40 link with each other.

In response to a change of a condition of the vehicle 1, the in-vehicle device 20 transmits an identification information signal including identification information from which a current condition of the vehicle 1 can be identified, to the mobile terminal 40 linking therewith. Current conditions of the vehicle 1 are determined by the in-vehicle device 20 on the basis of, for example, signals input from the switches 61 and ECUs 71, which are connected to the in-vehicle device 20 via the CAN 6. In addition, the conditions of the vehicle 1 include conditions of the vehicle 1 which relate to the operations of the user, and conditions of the vehicle 1 which do not relate to the operations of the user.

The conditions of the vehicle 1 relating to the operations of the user include conditions that are caused by operations of the switches 61 and the like by the user, such as a condition in which the user opens a door when getting in, a condition in which the user operates a start switch to start the engine, and a condition in which the user operates a headlight switch to turn headlights on. That is, the identification information is information from which an operation target that is operated by the user can be identified. An example of the operation target that is operated by the user is a switch 61. The conditions of the vehicle 1 not relating to the operations of the user include conditions that are changed independently of the operations of the switches 61 by the user, such as a condition in which the engine is stopped by the ECU for controlling idling stop and a condition in which reduction of a remaining amount of fuel (electricity) is detected by the ECU for monitoring the remaining amount of the fuel (electricity). Note that regarding the types of the conditions of the vehicle 1, the conditions that can be identified from identification information signals are not limited to the conditions of the vehicle 1 described herein.

Examples of the mobile terminal 40 include a mobile phone, a smartphone, a tablet computer, and the like. The communication section 43 of the mobile terminal 40 is formed of, for example, at least one of a communication module for a mobile phone line, a Bluetooth (registered trademark) communication module, and a WiFi communication module.

If the mobile terminal 40 or the communication section 43 has a communication module for a mobile phone line, the mobile terminal 40 or the communication section 43 can connect to a mobile phone network or the Internet via a base station (not shown), thereby enabling the user of the mobile terminal 40 to talk with another user of another phone terminal and to perform downloading and uploading of data via the Internet. The mobile terminal 40 may also perform wireless communication with an external communication facility, such as a WiFi router, by using a WiFi communication standard so as to connect to the Internet via the external communication facility.

The input section 47 and the display section 46 of the mobile terminal 40 may be formed of a display panel module of a touch panel system, for example. The user thereby can operate the mobile terminal 40 by operating the display panel module.

By operating the mobile terminal 40, the user can download a predetermined computer program, such as a linkage application, via the Internet and store the linkage application in the storage section 42. The linkage application may be stored in the storage section 42 when the mobile terminal 40 is manufactured. When the user performs an operation for starting the linkage application, the processing section 41 of the mobile terminal 40 executes the linkage application stored in the storage section 42. The linkage application may be executed by the processing section 41 of the mobile terminal 40 when a linkage state is established between the in-vehicle device 20 and the mobile terminal 40. When the linkage application is executed, the processing section 41 (or the processing section 21) operates as, for example, the identification information acquisition section 52, the sound source data acquisition section 53, the control section 54, and the association data edit section 55, as described above.

When the user operates an operation screen displayed on the display section 46 in executing the linkage application, the sound source data acquisition section 53 is enabled to download sound source data via the Internet. It is preferable that sound source data be downloaded from a server that a provider of the linkage application and/or a provider of the notification device 10 directly or indirectly manage(s), via the Internet. Downloaded sound source data is stored in the storage section 42. Meanwhile, the sound source data may be stored in the storage section 42 as initial sound source data when the linkage application is stored in the storage section 42. The sound source data being downloaded and the sound source data stored in the storage section 42 as the initial sound source data are hereinafter referred to also as "sound source data for notification". As described above, sound source data for notification is not sound source data that was originally stored in the in-vehicle device 20 but is sound source data that has been acquired from the outside. In addition, the sound source data for audio described above is different from the sound source data for notification.

The sound source data for notification includes two types of sound source data, which are music data constituted by music and voice data constituted by only voice, for example. If both types of music data and voice data are included in the sound source data for notification stored in the storage section 42, the sound source data acquisition section 53 determines whether each piece of sound source data for notification is music data or voice data. In this case, music data and voice data may be prepared in the abovementioned server in such a manner that the music data and the voice data can be downloaded in different file formats, and so that the sound source data acquisition section 53 can determine whether each piece of the sound source data for notification is music data or voice data. In addition, if music data and voice data have the same file format, the music data and the voice data may be prepared in such a manner that the music data and the voice data can be downloaded with identifiable file names. Furthermore, by embedding tag information in each piece of the sound source data being downloaded by the sound source data acquisition section 53, music data and voice data may become identifiable on the basis of the tag information. As a matter of course, the sound source data acquisition section 53 may determine whether each piece of the sound source data for notification is music data or voice data by using a different method. Each piece of the sound source data for notification that has been determined as to be music data or voice data is stored in the storage section 42 in such a manner that the type of each piece of sound source data can be identified.

The sound source data for notification can be downloaded for each theme. Examples of themes for the sound source data for notification that can be downloaded include themes related to cartoons, games, and famous people. If, for example, the theme of the sound source data for notification is a theme related to a game, sound source data for notification of music data in which the back ground music (BGM) of the game is reproduced and sound source data for notification of voice data in which a spoken line of a character of the game is reproduced are included in the theme. In addition, sound source data for notification of voice data in which a condition of the vehicle 1 is explained by using the voice of a character of a game may be included in the theme. Voice data for each theme may be configured in such a manner that the language of the voice data can be changed.

The storage section 42 further stores association data in which conditions of the vehicle 1 and sound source data for notification stored in the storage section 42 are respectively associated. FIG. 2 illustrates an example of association data. In the example of the association data illustrated in FIG. 2, large items of conditions of the vehicle 1 are shown in bold letters and small items of conditions of the vehicle 1 are shown in thin letters, and sound source data for notification is associated with each small item. The large items and small items shown in the example of the association data illustrated in FIG. 2 are provided as an example, and the numbers of large items and the numbers of small items may be larger or smaller than those in the example of FIG. 2.

The user can operate the mobile terminal 40 to make the association data edit section 55 operate, thereby enabling editing of the association data stored in the storage section 42. FIGS. 3A, 3B and 3C illustrate examples of setting screens for editing association data shown in a display panel module, which is the input section 47 and the display section 46 of the mobile terminal 40.

The example of the setting screen illustrated in FIG. 3A is displayed when the user performs a predetermined operation for starting editing of association data. In the example of the setting screen illustrated in FIG. 3A, a plurality of themes of sound source data for notification stored in the storage section 42 are displayed. In addition, in the example of the setting screen illustrated in FIG. 3A, the theme of the sound source data for notification being currently selected is emphasized with a checkmark 91. In the example of the setting screen illustrated in FIG. 3A, the user can select one theme of sound source data for notification from among the plurality of themes of sound source data for notification stored in the storage section 42, including the theme of the sound source data for notification being currently selected.

The example of the setting screen illustrated in FIG. 3B is displayed when the user selects one of themes of sound source data for notification from among the plurality of themes of sound source data for notification stored in the storage section 42, in the example of the setting screen illustrated in FIG. 3A. The example of the setting screen illustrated in FIG. 3B is an example of a setting screen that will be displayed when the user selects "theme 1" in the example of the setting screen illustrated in FIG. 3A. In the example of the setting screen illustrated in FIG. 3B, pieces of sound source data that are associated with respective conditions of the vehicle 1 in the current association data, or pieces of sound source data that are associated with respective conditions of the vehicle 1 in the initial setting of the selected theme are displayed.

In this case, it is preferable that the pieces of sound source data that are associated with respective conditions of the vehicle 1 in the initial setting of the selected theme be associated with the respective conditions without causing a feeling of strangeness, such as voice data explaining a condition of the vehicle 1, and sound source data of music data which is suitable for a condition of the vehicle 1. In the example of the setting screen illustrated in FIG. 3B, the user can select a condition of the vehicle 1 for which the user wants to change the sound source data that has been associated in the association data. In addition, as illustrated at the upper left of the example of the setting screen illustrated in FIG. 3B, the user can perform an operation for returning to the example of the setting screen illustrated in FIG. 3A, which is the previous setting screen.

The example of the setting screen illustrated in FIG. 3C is displayed when the user selects a condition of the vehicle 1 for which the user wants to change the sound source data associated therewith in the association data, in the example of the setting screen illustrated in FIG. 3B. The example of the setting screen illustrated in FIG. 3C is an example of a setting screen that will be displayed when the user selects "door open for getting-in" in the example of the setting screen illustrated in FIG. 3B. In the example of the setting screen illustrated in FIG. 3C, a list of sound source data for notification stored in the storage section 42 is displayed. In the list of sound source data for notification displayed in the example of the setting screen illustrated in FIG. 3C, sound source data included in "theme 1" including the sound source data which is associated with "door open for getting-in" in the current association data are displayed. In addition, in the example of the setting screen illustrated in FIG. 3C, the sound source data associated with "door open for getting-in" in the current association data is emphasized by a checkmark 91. Furthermore, in the example of the setting screen illustrated in FIG. 3C, a sample listening mark 93 is shown on the right side of each name of sound source data, and the user thereby can listen to each sound source data piece before changing the sound source data associated in the association data.

In the example of the setting screen illustrated in FIG. 3C, themes other than the theme selected in the example of the setting screen illustrated in FIG. 3B are displayed on the lower side of the setting screen (or when the setting screen is scrolled downward). The themes other than the theme selected in the example of the setting screen illustrated in FIG. 3B may be displayed in a collapsed state, and may be displayed in an expanded state by selecting a theme to display a list of pieces of sound source data of the theme. In the example of the setting screen illustrated in FIG. 3C, a right-pointing triangle mark 95 is shown on the right side of "theme 2", the list of which is not expanded, and an inverse triangle mark 96 is shown on the right side of "theme 3", the list of which is expanded. In the example of the setting screen illustrated in FIG. 3C, the user can change sound source data associated in the association data for the condition of the vehicle 1 selected in the example of the setting screen illustrated in FIG. 3B. In addition, as illustrated at the upper left of the example of the setting screen illustrated in FIG. 3C, the user can perform an operation for returning to the example of the setting screen illustrated in FIG. 3B, which is the previous setting screen.

As described above, the user can acquire sound source data for notification from the outside in accordance with the preference of the user, and also can freely edit the association data in accordance with the preference of the user. Consequently, the sound source data associated with conditions of the vehicle 1 can be set in accordance with the preference of the user, thereby improving convenience.

When the in-vehicle device 20 and the mobile terminal 40 link with each other and when the linkage application is being executed, the mobile terminal 40 outputs sound source data for notification in accordance with a condition of the vehicle 1, the condition being identified by receiving an identification information signal from the in-vehicle device 20. Output of the sound source data for notification by the mobile terminal 40 may be reproduced from the speaker 44 of the mobile terminal 40, or may be transmitted to the in-vehicle device 20. In a case where the sound source data for notification is transmitted to the in-vehicle device 20 from the mobile terminal 40, the sound source data for notification is reproduced from the speaker 24 of the in-vehicle device 20.

The user can perform an operation for acquiring not part of sound source data, such as frequency or tone, but the sound source data itself from the outside, and therefore, the acquired sound source data satisfies the preference of the user. In addition, the user can perform an operation for acquiring sound source data for notification and an operation for editing association data by using only the mobile terminal 40. Consequently, even in a case where the in-vehicle device 20 is not provided with a function for connecting to the Internet, or is not provided with a high-level operation interface, such as a display panel module of a touch panel system, the operation for acquiring sound source data for notification and the operation for editing association data are facilitated, thereby improving convenience. Furthermore, it is not necessary to store sound source data for notification and association data in the in-vehicle device 20, thereby reducing the amount of storage space used in the storage section 22 of the in-vehicle device 20.

Now, more specific explanation will be provided using a case where sound source data for notification is reproduced from the speaker 24 of the in-vehicle device 20. Note that a state where the in-vehicle device 20 and the mobile terminal 40 link with each other and where a linkage application is being executed is referred to also as "the linkage state".

When the mobile terminal 40 receives an identification information signal from the in-vehicle device 20 while being in the linkage state, the identification information acquisition section 52 acquires identification information from which a current condition of the vehicle 1 can be identified. After the identification information acquisition section 52 acquires identification information, the control section 54 selects sound source data for notification that corresponds to the current condition of the vehicle 1 from among the sound source data for notification stored in the storage section 42 on the basis of the association data stored in the storage section 42, and transmits the selected sound source data to the in-vehicle device 20. The in-vehicle device 20 that receives the sound source data for notification reproduces the sound source data for notification from the speaker 24.

As described above, the control section 54 transmits sound source data for notification corresponding to a condition of the vehicle 1 to the in-vehicle device 20, and the sound source data for notification is reproduced from the speaker 24. Therefore, there is no need to provide the in-vehicle device 20 with the functions of the control section, which further reduces the amount of storage space used in the storage section 22 of the in-vehicle device 20. In addition, since the sound source data for notification is reproduced from the speaker 24, a predetermined acoustic pressure can be maintained, and therefore, the user can recognize the sound source data for notification more easily than a case where the sound source data is reproduced from the mobile terminal 40. Furthermore, since sound source data for notification corresponding to a condition of the vehicle 1 is transmitted each time from the mobile terminal 40, it is not required to reflect association data in the in-vehicle device 20 even if the association data is edited in the mobile terminal 40 while the linkage state is not being established. As a result, a time lag due to transfer of association data from the mobile terminal 40 to the in-vehicle device 20 or synchronization of association data between the mobile terminal 40 and the in-vehicle device 20 does not occur, which further improves convenience.

It is assumed that, if the in-vehicle device 20 is an audio device 20, the audio device 20 may receive sound source data for notification while reproducing sound source data for audio from the speaker 24. In such a case, the sound source data for notification may be reproduced from the speaker 24 at a predetermined sound volume regardless of the reproduction sound volume of the sound source data for audio in the audio device 20. However, when the type of the sound source data for notification being received is music data, it is preferable that the audio device 20 reproduce only the music data while temporarily suspending the reproduction of the sound source data for audio. After completing the reproduction of the music data, which is the sound source data for notification, the audio device 20 may restart the reproduction of the sound source data for audio. Similarly, when the type of the sound source data for notification being received is voice data, it is preferable that the audio device 20 reduce the reproduction sound volume of the sound source data for audio to a predetermined value or less, and reproduce the voice data, which is the sound source data for notification, and the sound source data for audio in a superimposed manner. After completing the reproduction of the voice data, the audio device 20 may return the reproduction sound volume of the sound source data for audio to the original sound volume.

For this reason, it is desired that the audio device 20 be capable of determining whether the sound source data for notification being received from the mobile terminal 40 is music data or voice data. For example, as one method, when the mobile terminal 40 transmits sound source data for notification to the in-vehicle device 20, the mobile terminal 40 may transmit the sound source data for notification including information as to whether the type of the sound source data for notification to be transmitted is music data or voice data. As another method, the audio device 20 may further include a determination section (not shown) that determines whether sound source data for notification being received from the mobile terminal 40 is music data or voice data.

As described above, the audio device 20, which is the in-vehicle device 20, temporarily suspends the reproduction of sound source data for audio or temporarily reduces the sound volume depending on the type of the sound source data for notification. As a result, the user can recognize the sound of the reproduced sound source data for notification without causing a feeling of strangeness even in a case where both of the reproduction of sound source data for notification and the reproduction of sound source data for audio are performed by the same speaker 24.

Note that, as the speaker 24, the notification device 10 may use the speaker for notifying warnings installed in the meter panel (not shown) as described above to reproduce sound source data for notification. In this case, sound source data for notification corresponding to a condition of the vehicle 1 is reproduced even in a state where the CAN 6 is not activated, and pieces of warning information including information displayed in the meter panel can be integrally provided by the meter panel.

It is preferable that at least wireless communication using the communication standard of Bluetooth (registered trademark) be allowed between the in-vehicle device 20 and the mobile terminal 40. In this case, the in-vehicle device 20 may have a so-called hands-free function in which a phone call on the mobile terminal 40 with another phone terminal is performed by using the speaker 24 and the microphone 25 installed in the vehicle 1. The notification device 10 can use the wireless communication, which uses the communication standard of Bluetooth (registered trademark) between the in-vehicle device 20 and the mobile terminal 40 and which can be established for using a so-called hands-free function, for the linkage between the mobile terminal 40 and the in-vehicle device 20. The notification device 10 uses a highly versatile communication standard also for the linkage between the mobile terminal 40 and the in-vehicle device 20, and therefore, there is no need to support various communication standards in the in-vehicle device 20 and the mobile terminal 40. Thus, the cost for implementing the notification device 10 and the complexity of setting can be reduced, thereby improving convenience. In addition, wireless communication using a Bluetooth (registered trademark) communication standard uses less electricity than wireless communication using a WiFi communication standard, which reduces power consumption in the operations of the notification device 10.

Furthermore, wireless communication using both of the Bluetooth (registered trademark) communication standard and the WiFi communication standard may be allowed between the in-vehicle device 20 and the mobile terminal 40. In this case, the in-vehicle device 20 may enable a so-called hands-free function by using wireless communication using the Bluetooth (registered trademark) communication standard between the in-vehicle device 20 and the mobile terminal 40, and the notification device 10 may enable linkage between the in-vehicle device 20 and the mobile terminal 40 by using wireless communication using the WiFi communication standard between in-vehicle device 20 and the mobile terminal 40. Consequently, in a case where data transmission from the mobile terminal 40 to the in-vehicle device 20 by means of a so-called hands-free function and transmission of sound source data for notification from the mobile terminal 40 to the in-vehicle device 20 by means of the notification device 10 are performed concurrently, the communications can be performed smoothly even when either one of the communication traffics increases.

In the explanations above, sound source data for notification corresponding to a condition of the vehicle 1 is transmitted each time from the mobile terminal 40 to the in-vehicle device 20. However, the mobile terminal 40 does not have to transmit sound source data for notification corresponding to a condition of the vehicle 1 to the in-vehicle device 20 each time. That is, for example, by transferring the sound source data for notification and the association data stored in the storage section 42 of the mobile terminal 40 to the storage section 22 of the in-vehicle device 20, the sound source data for notification and the association data may be stored on the side of the in-vehicle device 20. In such a case, the processing section 21 of the in-vehicle device 20 may function as the identification information acquisition section 52, the control section 54, and so on.

In addition, in the explanations above, sound source data for notification is reproduced from the speaker 24 of the vehicle 1 or the speaker 44 of the mobile terminal 40. However, sound source data for notification may be reproduced from another speaker. For example, the notification device 10 may reproduce sound source data for notification from an external speaker other than the speaker 24 installed in the vehicle 1, the external speaker being connected to the mobile terminal 40 by wire or wirelessly.

Furthermore, if the vehicle 1 adopts a so-called smart entry system, in which door locks are automatically unlocked when predetermined authentication is established between an in-vehicle device and a keyless remote device, the mobile terminal 40 may also function as the keyless remote device of the smart entry system. In this case, the linkage state may be established when predetermined authentication is established using the mobile terminal 40. As a result, the notification device 10 can reproduce sound source data for notification corresponding to a condition of the vehicle 1 from the time when the user gets-in the vehicle 1.

The present application is not limited to the abovementioned exemplary embodiments, and those skilled in the art can easily modify the abovementioned exemplary embodiments within the scope of the claims. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A notification device comprising:
   an identification information acquisition section that acquires identification information output from an in-vehicle device in response to a change of a condition of a vehicle;
   a sound source data acquisition section capable of performing an acquisition operation of acquiring sound source data from an external source outside the notification device;
   a storage section capable of storing the sound source data acquired by the sound source acquisition section and association data in which the identification information and the sound source data are associated with each other; and
   a control section that outputs the sound source data on the basis of the association data when the identification information acquisition section acquires the identification information,
   wherein the sound source data acquisition section and the storage section are provided in a mobile terminal capable of being carried by a user of the vehicle and capable of connecting to the in-vehicle device, wherein the mobile terminal is provided with an association data edit section capable of editing the association data, wherein the control section is provided in the mobile terminal, and wherein the sound source data is output to the in-vehicle device and is reproduced from a speaker installed in the vehicle.

2. The notification device according to claim 1,
wherein the in-vehicle device is an audio device capable of reproducing different sound source data different from the sound source data, by driving the speaker, wherein, when music data constituted by sound source data the type of which is music is input from the control section while the audio device is reproducing the different sound source data, the audio device temporarily suspends the reproduction of the different sound source data to reproduce the music data, or wherein, when voice data constituted by only sound source data the type of which is voice is input from the control section while the audio device is reproducing the different sound source data, the audio device reduces reproduction sound volume of the different sound source data to a predetermined value or less to reproduce the voice data and the different sound source data in a superimposed manner.

3. The notification device according to claim 1,
wherein the identification information is output from the in-vehicle device in such a manner that the condition of the vehicle, the condition relating to at least operation of the user of the vehicle, can be identified.

4. The notification device according to claim 1,
wherein wireless connection is established between the mobile terminal and the in-vehicle device so as to enable communication between the mobile terminal and the in-vehicle device by using a wireless signal, and wherein the wireless connection serves also as wireless connection for a hands-free function in which a phone call on the mobile terminal is performed by using a microphone and the speaker installed in the vehicle.

5. The notification device according to claim 1,
wherein wireless connection is established between the mobile terminal and the in-vehicle device so as to enable communication between the mobile terminal and the in-vehicle device by using a wireless signal, wherein the in-vehicle device has a hands-free function in which a phone call on the mobile terminal is performed by using a microphone and the speaker installed in the vehicle, and wherein communication for the outputting of the sound source data is performed by using wireless connection that uses a different communication standard from the communication for the hands-free function.

6. The notification device according to claim 1, wherein the control section selects the sound source data associated with the acquired identification information by referring to the association data stored in the storage section.

7. The notification device according to claim 1,
wherein the in-vehicle device is an audio device capable of reproducing different sound source data different from the sound source data, by driving the speaker, wherein, when music data constituted by sound source data the type of which is music is input from the control section while the audio device is reproducing the different sound source data, the audio device temporarily suspends the reproduction of the different sound source data to reproduce the music data, and wherein, when voice data constituted by only sound source data the type of which is voice is input from the control section while the audio device is reproducing the different sound source data, the audio device reduces reproduction sound volume of the different sound source data to a predetermined value or less to reproduce the voice data and the different sound source data in a superimposed manner.

8. A notification device comprising:
an identification information acquisition processor configured to acquire identification information output from an in-vehicle device in response to a change of a condition of a vehicle;

a sound source data acquisition processor configured to perform an acquisition operation of acquiring sound source data from an external source outside the notification device;

a storage device storing the sound source data acquired by the sound source acquisition processor and association data in which the identification information and the sound source data are associated with each other; and a controller configured to output the sound source data on the basis of the association data when the identification information acquisition processor acquires the identification information, wherein the sound source data acquisition processor and the storage device are provided in a mobile terminal capable of being carried by a user of the vehicle and capable of connecting to the in-vehicle device, wherein the mobile terminal is provided with an association data edit processor configured to edit the association data, wherein the controller is provided in the mobile terminal, and wherein the sound source data is output to the in-vehicle device and is reproduced from a speaker installed in the vehicle.

9. The notification device according to claim 8,
wherein the in-vehicle device is an audio device capable of reproducing different sound source data different from the sound source data, by driving the speaker, wherein, when music data constituted by sound source data the type of which is music is input from the controller while the audio device is reproducing the different sound source data, the audio device temporarily suspends the reproduction of the different sound source data to reproduce the music data, or wherein, when voice data constituted by only sound source data the type of which is voice is input from the controller while the audio device is reproducing the different sound source data, the audio device reduces reproduction sound volume of the different sound source data to a predetermined value or less to reproduce the voice data and the different sound source data in a superimposed manner.

10. The notification device according to claim 8,
wherein the identification information is output from the in-vehicle device in such a manner that the condition of the vehicle, the condition relating to at least operation of the user of the vehicle, can be identified.

11. The notification device according to claim 8,
wherein wireless connection is established between the mobile terminal and the in-vehicle device so as to enable communication between the mobile terminal and the in-vehicle device by using a wireless signal, and wherein the wireless connection serves also as wireless connection for a hands-free function in which a phone call on the mobile terminal is performed by using a microphone and the speaker installed in the vehicle.

12. The notification device according to claim 8,
wherein wireless connection is established between the mobile terminal and the in-vehicle device so as to enable communication between the mobile terminal and the in-vehicle device by using a wireless signal,
wherein the in-vehicle device has a hands-free function in which a phone call on the mobile terminal is performed by using a microphone and the speaker installed in the vehicle, and
wherein communication for the outputting of the sound source data is performed by using wireless connection that uses a different communication standard from the communication for the hands-free function.

13. The notification device according to claim 8, wherein the controller selects the sound source data associated with the acquired identification information by referring to the association data stored in the storage device.

14. The notification device according to claim 8,
wherein the in-vehicle device is an audio device capable of reproducing different sound source data different from the sound source data, by driving the speaker,
wherein, when music data constituted by sound source data the type of which is music is input from the controller while the audio device is reproducing the different sound source data, the audio device temporarily suspends the reproduction of the different sound source data to reproduce the music data, and
wherein, when voice data constituted by only sound source data the type of which is voice is input from the controller while the audio device is reproducing the different sound source data, the audio device reduces reproduction sound volume of the different sound source data to a predetermined value or less to reproduce the voice data and the different sound source data in a superimposed manner.

15. A notification device comprising:
an identification information acquisition processor configured to acquire identification information output from an in-vehicle device in response to a change of a condition of a vehicle;
a sound source data acquisition processor configured to perform an acquisition operation of acquiring sound source data from an external source outside the notification device;
a storage device storing the sound source data acquired by the sound source acquisition processor and association data in which the identification information and the sound source data are associated with each other; and
a controller configured to output the sound source data on the basis of the association data when the identification information acquisition processor acquires the identification information,
wherein the in-vehicle device is an audio device capable of reproducing different sound source data different from the sound source data, by driving the speaker, the audio device including a determination processor configured to determine whether the sound source data is a music data constituted by sound source data the type of which is music, or a voice data constituted by only sound source data the type of which is voice,
wherein, when the music data constituted by the sound source data the type of which is music is input from the controller while the audio device is reproducing the different sound source data, the audio device temporarily suspends the reproduction of the different sound source data to reproduce the music data, and
wherein, when the voice data constituted by only the sound source data the type of which is voice is input from the controller while the audio device is reproducing the different sound source data, the audio device reduces reproduction sound volume of the different sound source data to a predetermined value or less to reproduce the voice data and the different sound source data in a superimposed manner.

* * * * *